United States Patent
Miao et al.

(10) Patent No.: US 12,193,063 B2
(45) Date of Patent: Jan. 7, 2025

(54) BEAM SWITCHING METHOD AND APPARATUS

(71) Applicant: DATANG MOBILE COMMUNICATIONS EQUIPMENT CO., LTD., Beijing (CN)

(72) Inventors: Deshan Miao, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 406 days.

(21) Appl. No.: 17/607,416

(22) PCT Filed: Mar. 25, 2020

(86) PCT No.: PCT/CN2020/081238
§ 371 (c)(1),
(2) Date: Oct. 29, 2021

(87) PCT Pub. No.: WO2020/220871
PCT Pub. Date: Nov. 5, 2020

(65) Prior Publication Data
US 2022/0225421 A1    Jul. 14, 2022

(30) Foreign Application Priority Data
Apr. 30, 2019 (CN) .................. 201910364302.X

(51) Int. Cl.
*H04W 74/0833* (2024.01)
*H04B 7/08* (2006.01)
*H04W 36/00* (2009.01)

(52) U.S. Cl.
CPC ........ *H04W 74/0833* (2013.01); *H04B 7/088* (2013.01); *H04W 36/0072* (2013.01)

(58) Field of Classification Search
CPC .................. H04W 74/0833; H04B 7/088
See application file for complete search history.

(56) References Cited

U.S. PATENT DOCUMENTS

| | | | |
|---|---|---|---|
| 2015/0382205 A1* | 12/2015 | Lee | H04W 52/365 370/329 |
| 2016/0007261 A1* | 1/2016 | Oh | H04B 7/088 455/438 |

(Continued)

FOREIGN PATENT DOCUMENTS

| | | |
|---|---|---|
| CN | 108024385 A | 5/2018 |
| CN | 109417415 A | 3/2019 |

(Continued)

OTHER PUBLICATIONS

CMCC,"Beam Related Measurement Report and Inter-cell HO in NR", 3GPP TSG-RAN WG2 Meeting #97, Athens, Greece, Feb. 13-17, 2017, total 7 pages, R2-1701921 (Revision of R2-1700532).

(Continued)

*Primary Examiner* — Yemane Mesfin
*Assistant Examiner* — Salma Ayad
(74) *Attorney, Agent, or Firm* — Kilpatrick Townsend & Stockton LLP

(57) ABSTRACT

Disclosed are a beam switching method and apparatus, relating to the field of wireless communications, and used for reducing beam switching time and reducing the signaling overhead of switching. The method comprises: determining a beam that needs to be switched, and obtaining the beam identifier of a switched beam and physical random access channel (PRACH) resource indication information; and after the switching of the beam is completed, transmitting, to a network device on the time frequency resource of the switched beam indicated by the PRACH resource indication information, a PRACH signal used for indicating that the switching of the beam is completed. By means of the beam (Continued)

switching method, a beam switching process does not need to transmit an RRC signaling to the network device, and does not need to wait to establish an RRC connection with the network device.

18 Claims, 6 Drawing Sheets

(56) References Cited

U.S. PATENT DOCUMENTS

| | | | |
|---|---|---|---|
| 2018/0084441 | A1 | 3/2018 | Nagaraja et al. |
| 2018/0212659 | A1* | 7/2018 | Xiong .................. H04B 7/0695 |
| 2018/0279379 | A1 | 9/2018 | Tsai et al. |
| 2020/0068509 | A1* | 2/2020 | Ahn ..................... H04W 52/146 |
| 2020/0128455 | A1* | 4/2020 | Da Silva ............. H04W 74/004 |
| 2020/0351946 | A1* | 11/2020 | Pang ................. H04W 72/0453 |
| 2021/0144768 | A1* | 5/2021 | Isokangas ......... H04W 36/0077 |

FOREIGN PATENT DOCUMENTS

| | | | |
|---|---|---|---|
| CN | 109417739 A | 3/2019 | |
| CN | 109644494 A | 4/2019 | |
| KR | 20180135881 A | 12/2018 | |
| KR | 20190036467 A | 4/2019 | |
| TW | 201914346 A | 4/2019 | |
| WO | 2018083649 A1 | 5/2018 | |
| WO | 2018129300 A1 | 7/2018 | |
| WO | 2018201450 A1 | 11/2018 | |
| WO | WO-2018203678 A1 * | 11/2018 | ........... H04B 17/318 |
| WO | 2019032696 A1 | 2/2019 | |

OTHER PUBLICATIONS

MediaTek Inc., "Handover in NR Considering Multiple-beam Operation", 3GPP TSG-RAN WG2 Meeting #98, Hangzhou, China, May 15-19, 2017, total 6 pages, R2-1704525.

CATT, "BWP for Beam Failure Recovery", 3GPP TSG-RAN WG2 NR Ad hoc 011, Vancouver, Canada, Jan. 22-Jan. 26, 2018, total 4 pages, R2-1800160.

Intel Corporation, "Way Forward on TCI State Switching Delay", 3GPP TSG-RAN WG4 Meeting #90, Athens, GR, Feb. 25-Mar. 1, 2019, total 4 pages, R4-1900112.

Qualcomm Incorporated, "BWP configuration during handover", 3GPP TSG-RAN WG2 Meeting #100, Vancouver, Canada, Jan. 22-26, 2018, total 4 pages, R2-1801270.

* cited by examiner

BEAM SWITCHING METHOD AND APPARATUS

CROSS-REFERENCE OF RELATED APPLICATIONS

The disclosure is a national phase entry under 35 U.S.C. § 371 of International Application No. PCT/CN2020/081238, filed on Mar. 25, 2020, which claims the priority from Chinese Patent Application No. 201910364302.X, filed with the China National Intellectual Property Administration on Apr. 30, 2019 and entitled "Beam Switching Method and Apparatus", which is hereby incorporated by reference in its entirety.

FIELD

The disclosure relates to the field of wireless communication technologies and particularly to a beam switching method and apparatus.

BACKGROUND

In the low-orbit satellite communication system, a satellite moves around the earth at a speed of about 7.8 km/s. As such the link between the satellite and a user switches frequently. Generally a satellite carries a plurality of beams, and adjacent beams can use different frequency resources. The switching of adjacent beams requires the terminal to achieve synchronization and perform data communication under the new beam.

In the existing 5G NR system, when the inter-cell handover is performed through service link switching, the residence time of the terminal in each beam is generally about 10 seconds. In the prior art, the resource reconfiguration of the Radio Resource Control (RRC) layer is needed in the switching process. The frequent switching may generate the huge RRC signaling overhead, and therefore require a long processing time.

Furthermore, the Bandwidth Part (BWP) switching mechanism can be applied to the switching process of different sub-bands in the same carrier. Adjacent beams of the satellite may apply different radio frequency links, where the azimuth angles of the beams may be different. Therefore, there are also certain constraints in using the BWP switching mechanism for time and frequency synchronization. Since the satellite is in the mobile state, the switching between adjacent beams of the satellite is irreversible, and the feedback cannot be obtained in the BWP switching mechanism. Therefore, there is a problem by using the BWP switching mechanism for switching between adjacent beams.

To sum up, the beam switching in the prior art is mostly intra-frequency beam switching or cell-level switching, the beam switching time is relatively long, and the signaling overhead is relatively large.

SUMMARY

The disclosure provides a beam switching method and apparatus, to reduce the beam switching time and lower the switching signaling overhead simultaneously.

In one embodiment, a beam switching method provided by an embodiment of the disclosure is applied to the terminal side and includes:

determining that beam switching needs to be performed, and obtaining a beam identifier of a target beam and Physical Random Access Channel (PRACH) resource indication; and sending a PRACH signal for indicating that beam switching is completed to a network equipment on time-frequency resources of the target beam indicated by the PRACH resource indication after the beam switching is completed.

In the above method, the terminal obtains the beam identifier of the target beam and the PRACH resource indication and performs the beam switching after determining that beam switching needs to be performed in the beam switching process. After the beam switching is completed, the terminal sends a PRACH signal for indicating that the beam switching is completed to the network equipment on the time-frequency resources indicated by the PRACH resource indication. In the entire beam switching process, the RRC resource reconfiguration is not required, and there is no need to send the RRC signaling to the network equipment and to wait for an RRC connection to be established with the network equipment, so the beam switching time can be reduced and the switching signaling overhead can be lowered at the same time.

In a possible implementation, determining that beam switching needs to be performed and obtaining a beam identifier of a target beam and PRACH resource indication, includes: determining that beam switching needs to be performed upon receiving a beam switching command sent by the network equipment, and obtaining the beam identifier of the target beam and the PRACH resource indication from the beam switching command, wherein the beam switching command contains the target beam identifier and the PRACH resource indication.

In a possible implementation, the beam switching command further includes candidate target beam identifiers.

In the above method, the beam switching command includes not only the beam identifier of the target beam and the PRACH resource indication, but also the candidate target beam identifiers. In this way, if it is impossible to switch to the target beam in the beam switching process, it is also possible to switch to a candidate target beam, improving the reliability of beam switching.

In a possible implementation, after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, the method further includes: detecting a Synchronization Signal Block (SSB) or a common reference signal of a beam identified by the beam identifier; and performing downlink synchronization with a downlink beam identified by the beam identifier based on the SSB or the common reference signal.

In the above method, during the beam switching process, after obtaining the beam identifier of the target beam, the downlink synchronization can be achieved with the target beam by detecting the SSB or common reference signal of the beam identified by the beam identifier and then performing the downlink synchronization with the downlink beam identified by the beam identifier based on the SSB or the common reference signal, ensuring the success of the switching, and improving the reliability of the beam switching.

In a possible implementation, after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, the method further includes: adjusting a carrier frequency and a transmission beam direction of a terminal to be aligned with a carrier frequency and a beam direction of an uplink beam identified by the beam identifier.

In a possible implementation, the beam switching command includes a BWP switching command or a dynamic Carrier (CA) switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In a possible implementation, determining that beam switching needs to be performed and obtaining a beam identifier of a target beam and PRACH resource indication, includes: receiving configuration information sent by the network equipment for monitoring a reference signal of a candidate beam, wherein the configuration information includes reference signals of one or more candidate beams and PRACH resource indication; determining that a current serving beam fails to be connected according to a monitoring result of a reference signal of the current serving beam and the reference signals of the candidate beams, determining that beam switching needs to be performed, determining a beam identifier of a target beam from the candidate beams, and obtaining the PRACH resource indication from the configuration information.

In the above method, after receiving the configuration information for monitoring the reference signals of the candidate beams sent by the network equipment, the terminal monitors the reference signal of the current serving beam and the reference signals of the candidate beams, determines that the current serving beam fails to be connected according to the monitoring result of the reference signal of the current serving beam and the reference signals of the candidate beams, determines that beam switching needs to be performed, then determines the beam identifier of the target beam from the candidate beams, and obtains the PRACH resource indication from the configuration information to perform the beam switching. In the entire beam switching process, the RRC resource reconfiguration is not required, and there is no need to send the RRC signaling to the network equipment and to wait for an RRC connection to be established with the network equipment, so the beam switching time can be reduced and the switching signaling overhead can be lowered at the same time.

In a possible implementation, determining that a current serving beam fails to be connected according to a monitoring result of a reference signal of the current serving beam and the reference signals of the candidate beams, includes: determining that a current serving beam fails to be connected when determining, according to a monitoring result of a reference signal of the current serving beam and the reference signals of the candidate beams, that the reference signal of the current serving beam and the reference signals of the candidate beams satisfy one or more of:
condition 1: the Block Error Ratio (BLER) of a Physical Downlink Shared Channel (PDSCH) corresponding to the current serving beam is greater than a first preset threshold;
condition 2: the Reference Signal Receiving Power (RSRP) of the current serving beam is less than a second preset threshold;
condition 3: the RSRP of at least one of the candidate beams is greater than a third preset threshold;
condition 4: the RSRP of at least one of the candidate beams is greater than the RSRP of the current serving beam.

In a possible implementation, determining a beam identifier of a target beam from the candidate beams, includes: determining a beam identifier of a beam with RSRP greater than the RSRP of the current serving beam as the beam identifier of the target beam; or determining a beam identifier of a beam with RSRP greater than the third preset threshold as the beam identifier of the target beam.

In a possible implementation, after determining the beam identifier of the target beam from the candidate beams and obtaining the PRACH resource indication from the configuration information, the method further includes: determining a switched uplink beam of a terminal based on the beam identifier of the target beam, and adjusting a carrier frequency and a transmission beam direction of the terminal to be aligned with a carrier frequency and a beam direction of the switched uplink beam.

In a possible implementation, the PRACH response information sent by the network equipment is received, wherein the PRACH response information includes Timing Advance (TA) and/or frequency offset information.

In one embodiment, a beam switching method provided by embodiments of the disclosure is applied to the network side and includes: sending a beam switching command for instructing a terminal to perform beam switching to the terminal, wherein the beam switching command includes a target beam identifier and PRACH resource indication; and receiving a PRACH signal for indicating that the beam switching is completed sent by the terminal on time-frequency resources of a target beam indicated by the PRACH resource indication.

In the above method, the network equipment sends a beam switching command for instructing the terminal to perform the beam switching to the terminal, where the beam switching command includes the target beam identifier and PRACH resource indication. When receiving the beam switching command, the terminal determines that beam switching needs to be performed and then performs the beam switching according to the beam identifier of the target beam and the PRACH resource indication included in the beam switching command. After the beam switching is completed, the terminal sends a PRACH signal for indicating that the beam switching is completed to the network equipment on the time-frequency resource indicated by the PRACH resource indication, and the network equipment determines that the beam switching is completed when detecting the PRACH signal sent by the terminal. In the entire beam switching process, the RRC resource reconfiguration is not required, and there is no need to send the RRC signaling to the network equipment and to wait for an RRC connection to be established with the network equipment, so the beam switching time can be reduced and the switching signaling overhead can be lowered at the same time.

In a possible implementation, the beam switching command further includes candidate target beam identifiers.

In the above method, the beam switching command includes not only the beam identifier of the target beam and the PRACH resource indication, but also the candidate target beam identifiers. In this way, if the terminal cannot switch to the target beam in the beam switching process, it is also possible to switch to a candidate target beam, improving the reliability of beam switching.

In a possible implementation, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In a possible implementation, sending a beam switching command for instructing a terminal to perform beam switching to the terminal, includes: sending a beam switching command for instructing a terminal to perform beam switching to the terminal through Downlink Control Information (DCI) or Medium Access Control (MAC) signaling.

In a possible implementation, the configuration information for monitoring a reference signal of a candidate beam is sent to the terminal, wherein the configuration information includes reference signals of one or more candidate beams and the PRACH resource indication.

In the above method, the network equipment sends the configuration information for monitoring the reference signals of the candidate beams to the terminal; after receiving the configuration information, the terminal monitors the reference signal of the current serving beam and the reference signals of the candidate beams, determines that the current serving beam fails to be connected according to the monitoring result of the reference signal of the current serving beam and the reference signals of the candidate beams, determines that beam switching needs to be performed, then determines the beam identifier of the target beam from the candidate beams, and obtains the PRACH resource indication from the configuration information to perform the beam switching. In the entire beam switching process, the RRC resource reconfiguration is not required, and there is no need to send the RRC signaling to the network equipment and to wait for an RRC connection to be established with the network equipment, so the beam switching time can be reduced and the switching signaling overhead can be lowered at the same time.

In a possible implementation, the PRACH response information is sent to the terminal, wherein the PRACH response information includes TA and/or frequency offset information.

In one embodiment, a beam switching apparatus provided by embodiments of the disclosure includes: a processor and a memory; wherein the processor is configured to read a program in the memory and perform the process of: determining that beam switching needs to be performed, and obtaining a beam identifier of a target beam and PRACH resource indication; and sending a PRACH signal for indicating that beam switching is completed to a network equipment on time-frequency resources of the target beam indicated by the PRACH resource indication after the beam switching is completed.

In a possible implementation, the processor is specifically configured to: determine that beam switching needs to be performed upon receiving a beam switching command sent by the network equipment, and obtain the beam identifier of the target beam and the PRACH resource indication from the beam switching command, wherein the beam switching command contains the target beam identifier and the PRACH resource indication.

In a possible implementation, the beam switching command further includes candidate target beam identifiers.

In a possible implementation, the processor is further configured to: after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, detect an SSB or a common reference signal of a beam identified by the beam identifier; and perform downlink synchronization with a downlink beam identified by the beam identifier based on the SSB or the common reference signal.

In a possible implementation, the processor is further configured to: after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, adjust a carrier frequency and a transmission beam direction of a terminal to be aligned with a carrier frequency and a beam direction of an uplink beam identified by the beam identifier.

In a possible implementation, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In a possible implementation, the processor is specifically configured to: receive configuration information sent by the network equipment for monitoring a reference signal of a candidate beam, wherein the configuration information includes reference signals of one or more candidate beams and PRACH resource indication; determine that a current serving beam fails to be connected according to a monitoring result of a reference signal of the current serving beam and the reference signals of the candidate beams, determine that beam switching needs to be performed, determine a beam identifier of a target beam from the candidate beams, and obtain the PRACH resource indication from the configuration information.

In a possible implementation, the processor is specifically configured to: determine that the current serving beam fails to be connected when determining, according to the monitoring result of the reference signal of the current serving beam and the reference signals of the candidate beams, that the reference signal of the current serving beam and the reference signals of the candidate beams satisfy one or more of:

condition 1: the BLER of a PDSCH corresponding to the current serving beam is greater than a first preset threshold;

condition 2: the RSRP of the current serving beam is less than a second preset threshold;

condition 3: the RSRP of at least one of the candidate beams is greater than a third preset threshold;

condition 4: the RSRP of at least one of the candidate beams is greater than the RSRP of the current serving beam.

In a possible implementation, the processor is specifically configured to: determine a beam identifier of a beam with RSRP greater than the RSRP of the current serving beam as the beam identifier of the target beam; or determine a beam identifier of a beam with RSRP greater than the third preset threshold as the beam identifier of the target beam.

In a possible implementation, the processor is further configured to: after determining the beam identifier of the target beam from the candidate beams and obtaining the PRACH resource indication from the configuration information, determine a switched uplink beam of a terminal based on the beam identifier of the target beam, and adjust a carrier frequency and a transmission beam direction of the terminal to be aligned with a carrier frequency and a beam direction of the switched uplink beam.

In a possible implementation, the processor is further configured to: receive the PRACH response information sent by the network equipment, wherein the PRACH response information includes TA and/or frequency offset information.

In one embodiment, a beam switching device provided by an embodiment of the disclosure includes: a processor and a memory; wherein, the processor is configured to read a program in the memory and perform the process of: sending a beam switching command for instructing a terminal to perform beam switching to the terminal, wherein the beam switching command includes a target beam identifier and PRACH resource indication; and receiving a PRACH signal for indicating that the beam switching is completed sent by the terminal on time-frequency resources of a target beam indicated by the PRACH resource indication.

In a possible implementation, the beam switching command further includes candidate target beam identifiers.

In a possible implementation, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In a possible implementation, the processor is specifically configured to: send a beam switching command for instructing a terminal to perform beam switching to the terminal through DCI or MAC signaling.

In a possible implementation, the processor is further configured to: send the configuration information for monitoring a reference signal of a candidate beam to the terminal, wherein the configuration information includes reference signals of one or more candidate beams and the PRACH resource indication.

In a possible implementation, the processor is further configured to: send the PRACH response information to the terminal, wherein the PRACH response information includes TA and/or frequency offset information.

Insome embodiments of the disclosure further provide a beam switching apparatus including a processing module and a sending module, wherein the processing module is configured to determine that beam switching needs to be performed, and obtain a beam identifier of a target beam and PRACH resource indication; and the sending module is configured to send a PRACH signal for indicating that beam switching is completed to a network equipment on time-frequency resources of the target beam indicated by the PRACH resource indication after the beam switching is completed.

In a possible implementation, the processing module is specifically configured to: determine that beam switching needs to be performed upon receiving a beam switching command sent by the network equipment, and obtain the beam identifier of the target beam and the PRACH resource indication from the beam switching command, wherein the beam switching command contains the target beam identifier and the PRACH resource indication.

In a possible implementation, the beam switching command further includes candidate target beam identifiers.

In a possible implementation, the processing module is further configured to: after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, detect an SSB or a common reference signal of a beam identified by the beam identifier; and perform downlink synchronization with a downlink beam identified by the beam identifier based on the SSB or the common reference signal.

In a possible implementation, the processing module is further configured to: after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, adjust a carrier frequency and a transmission beam direction of a terminal to be aligned with a carrier frequency and a beam direction of an uplink beam identified by the beam identifier.

In a possible implementation, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In a possible implementation, the processing module is specifically configured to: receive configuration information sent by the network equipment for monitoring a reference signal of a candidate beam, wherein the configuration information includes reference signals of one or more candidate beams and the PRACH resource indication; determine that a current serving beam fails to be connected according to a monitoring result of a reference signal of the current serving beam and the reference signals of the candidate beams, determine that beam switching needs to be performed, determine a beam identifier of a target beam from the candidate beams, and obtain the PRACH resource indication from the configuration information.

In a possible implementation, the processing module is specifically configured to: determine that the current serving beam fails to be connected when determining, according to the monitoring result of the reference signal of the current serving beam and the reference signals of the candidate beams, that the reference signal of the current serving beam and the reference signals of the candidate beams satisfy one or more of:

condition 1: the BLER of a PDSCH corresponding to the current serving beam is greater than a first preset threshold;

condition 2: the RSRP of the current serving beam is less than a second preset threshold;

condition 3: the RSRP of at least one of the candidate beams is greater than a third preset threshold;

condition 4: the RSRP of at least one of the candidate beams is greater than the RSRP of the current serving beam.

In a possible implementation, the processing module is specifically configured to: determine a beam identifier of a beam with RSRP greater than the RSRP of the current serving beam as the beam identifier of the target beam; or determine a beam identifier of a beam with RSRP greater than the third preset threshold as the beam identifier of the target beam.

In a possible implementation, the processing module is further configured to: after determining the beam identifier of the target beam from the candidate beams and obtaining the PRACH resource indication from the configuration information, determine a switched uplink beam of a terminal based on the beam identifier of the target beam, and adjust a carrier frequency and a transmission beam direction of the terminal to be aligned with a carrier frequency and a beam direction of the switched uplink beam.

In a possible implementation, the processing module is further configured to: receive the PRACH response information sent by the network equipment, wherein the PRACH response information includes TA and/or frequency offset information.

In some embodiments of the disclosure further provide a beam switching apparatus including a sending module and a receiving module, wherein the sending module is configured to send a beam switching command for instructing a terminal to perform beam switching to the terminal, wherein the beam switching command includes a target beam identifier and PRACH resource indication; and the receiving module is configured to receive a PRACH signal for indicating that the beam switching is completed sent by the terminal on time-frequency resources of a target beam indicated by the PRACH resource indication.

In a possible implementation, the beam switching command further includes candidate target beam identifiers.

In a possible implementation, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In a possible implementation, the sending module is specifically configured to: send a beam switching command for instructing a terminal to perform beam switching to the terminal through DCI or MAC signaling.

In a possible implementation, the sending module is further configured to: send the configuration information for monitoring a reference signal of a candidate beam to the terminal, wherein the configuration information includes reference signals of one or more candidate beams and the PRACH resource indication.

In a possible implementation, the sending module is further configured to: send the PRACH response information to the terminal, wherein the PRACH response information includes TA and/or frequency offset information.

In some embodiments of the disclosure further provides a computer storage medium storing a computer program thereon, where the program, when executed by a processing unit, implements the steps of the method in the embodiments.

Furthermore, the effects brought about by any implementation in the embodiments can refer to the effects brought about by different implementations of the other embodiments, and will not be repeated here.

BRIEF DESCRIPTION OF THE DRAWINGS

In order to illustrate the embodiments of the disclosure more clearly, the accompanying figures which need to be used in describing the embodiments will be introduced below briefly.

DETAILED DESCRIPTION

Embodiments of the disclosure will be further illustrated below in details with reference to the accompanying figures. The described embodiments are merely a part of the embodiments of the disclosure but not all the embodiments.

Some words that appear herein will be explained below.

1. The term "and/or" in the embodiments of the disclosure describes the association relationship of associated objects, indicating that there may be three relationships, for example, A and/or B may represent: only A, both A and B, and only B. The character "/" generally indicates that the associated objects have a kind of "or" relationship.

2. The term "terminal" in the embodiments of the disclosure represents a communication device that can switch captured beams, including mobile phone, computer, tablet, etc.

3. The term "bent-pipe communication mode" in the embodiments of the disclosure means that the satellite only transparently forwards a signal and does not do any processing on the signal.

4. The term "service link switching" in the embodiments of the disclosure represents the switching for a terminal between different beams of a same satellite or of different satellites, for the purpose of selecting a suitable communication link.

5. The term "adjacent beams" in the embodiments of the disclosure includes not only adjacent beams of a same satellite, but also adjacent beams of different satellites.

The application scenarios described in the embodiments of the disclosure are intended to illustrate the embodiments of the disclosure more clearly, and do not constitute a limitation on the provided in the embodiments of the disclosure. In some embodiments, with the appearance of new application scenarios, the embodiments of the disclosure are also applicable to similar problems. Here, in the description of the disclosure, "multiple" means two or more unless otherwise specified.

Figure 1:
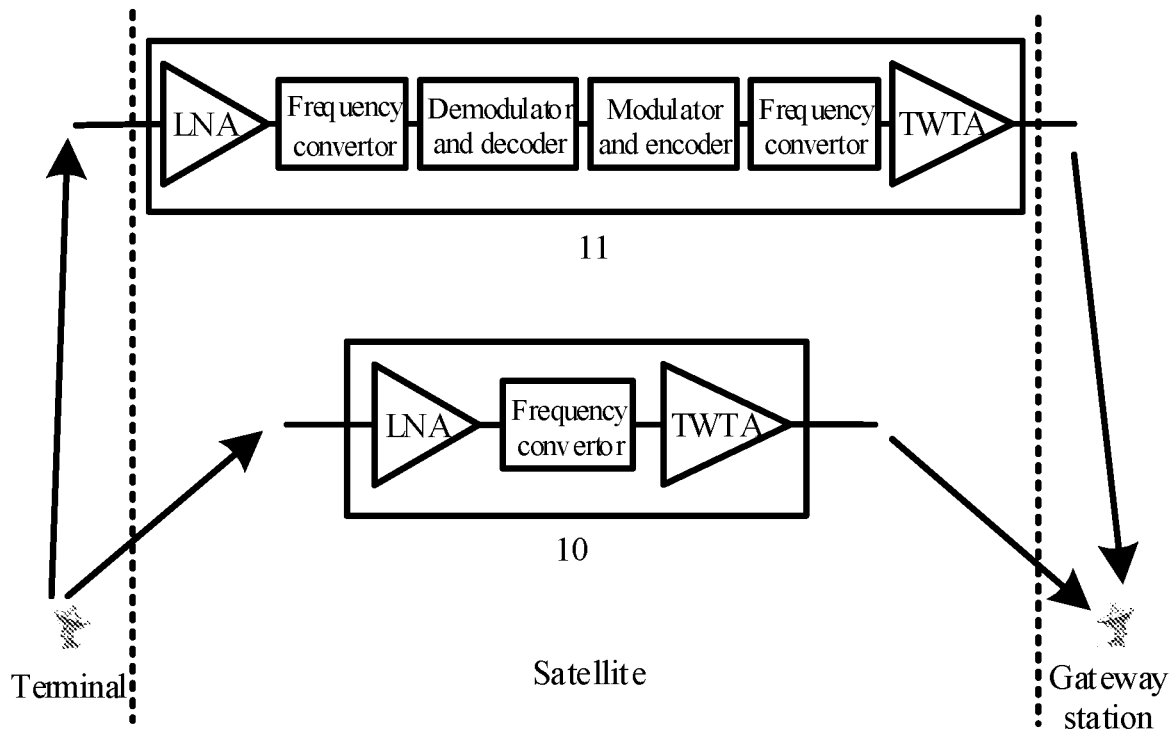
FIG. 1 is a schematic diagram illustrating the principles of two operating modes of a satellite in satellite communications in the prior art.

As shown in FIG. 1, there are two working modes in the satellite communications: one is the bent-pipe communication mode in which the satellite only transparently forwards signals without any processing and the terminal communicates with the gateway station, such as the working mode of the uplink 10 shown in FIG. 1; and the other is the regenerative communication mode in which the satellite can detect the information of a received signal and process and forward it, complete the function of the base station, and connect the terminal with the gateway station, such as the working mode of the uplink 11 shown in the FIG. 1. In the satellite communications, the connection between a terminal user and a satellite is called the service link, and the connection between a satellite and a gateway station is the feeder link.

In the bent-pipe communication mode, there are two kinds of switching: one is service link switching and the other is feeder link switching. In the service link switching, the terminal may switch between different beams of different satellites or between different beams of a same satellite to select a suitable communication link. In the feeder link switching, the satellite may switch between different gateway stations to select a suitable gateway station.

The beam switching method involved in the disclosure is applicable for both the bent-pipe communication mode and the regenerative communication mode. In the bent-pipe communication mode, the network side of the service link for beam switching is controlled by the gateway station; while in the regenerative communication mode, the network side of the service link for beam switching is controlled by the satellite, where the satellite acts as a base station.

Due to a fact that each satellite can carry beams and the movement of the satellite, both the intra-satellite beam switching and inter-satellite switching need to be considered in the service link switching and feeder link switching. In a typical case, adjacent beams of the same satellite may use different frequency band resources, so this kind of beam switching has the dual characteristics of frequency switching and beam switching. Different satellite beams have strong directivity regardless of beam transmission or beam reception, so the beam switching includes not only frequency-domain switching but also beam direction switching.

In the existing 5G NR system, the switching between beams takes place within a cell, and the beams have the same frequency, which cannot be directly applied to satellite switching. In the case of 5G inter-cell switching, the cells may be in different frequency bands, but the switching between cells needs to be carried out in accordance with the normal switching process, and requires the Radio Resource Control (RRC) resource reconfiguration. Due to the long transmission and processing time of the RRC signaling, this will prolong the beam switching time.

In the 5G system, there is also a switching mechanism based on bandwidth part (BWP) that can be applied to the switching between different sub-bands of the same carrier. However, the existing switching between BWPs is only used for the scheduling transmission of data. It is assumed that adjacent BWPs are within a carrier and there are certain constraints on the time and frequency synchronization, but adjacent beams of the satellite may apply different radio frequency links and the azimuth angles of the beams are also different. The switching between BWPs is reversible while the beam switching of the satellite is irreversible. Since the satellite is mobile, there are still some problems by directly applying the existing BWP switching mechanism to the switching between satellite beams.

In view of the above, the beam switching in the prior art is mostly intra-frequency beam switching or cell-level switching, the beam switching time is relatively long, and the signaling overhead is relatively large.

Therefore, embodiments of the disclosure provide a beam switching method, to reduce the switching time of beam switching between satellites and lower the switching signaling overhead.

In view of the foregoing scenarios, the embodiments of the disclosure will be further described in detail below in combination with the accompanying drawings of the specification.

In the beam switching method provided by the embodiments of the disclosure, the switching between adjacent satellite beams (including adjacent beams of the same satellite and adjacent beams of different satellites) is completed based on the dynamic switching mechanism in the cell switching of multiple beams of the same satellite, and a Physical Random Access Channel (PRACH) signal is used to notify the network equipment to complete the beam switching. For the convenience of description, the network equipment in the following description in embodiments is illustrated by using gateway station, which is for the bent-pipe communication mode. While the gateway station can be changed to a satellite, which is applied to the regeneration communication mode. The method of this embodiment is fully applicable.

Here, the PRACH signal is sent on the switched satellite beam, and the PRACH resources are also the time-frequency resources of the switched satellite beam.

Here, the dynamic switching mechanism can use a BWP switching command for beam switching, or can use a dynamic carrier switching command for beam switching, or can use the beam recovery mechanism to complete the beam switching based on a beam measurement command sent by the gateway station. The three switching mechanisms described above will be illustrated in detail below in conjunction with specific embodiments.

Switching mechanism 1: a BWP switching command is used for beam switching.

In the BWP switching of the NR, the switching of adjacent BWPs can use the Downlink Control Information (DCI) to indicate the switching. The DCI signaling includes the resource indication for the terminal to perform the beam indication in the switched BWP. However, in the satellite communications, switching to a new BWP requires synchronization on a new frequency band, because the new BWP may apply a different radio frequency channel from the original BWP and the frequency synchronization needs to be achieved again.

In the solution for beam switching using the BWP switching command provided in the embodiments of the disclosure, the configuration information of the new BWP can be configured before the switching, but the BWP switching indication signaling needs to include at least one or more of: uplink BWP identifier, downlink BWP identifier, and PRACH resource indication.

Here, the BWP switching indication signaling may be completed using DCI signaling or MAC signaling, and the BWP identifiers are used to distinguish different BWPs. In a specific implementation, the BWP ID can be used.

It should be noted that, in the BWP switching indication signaling, the uplink BWP identifier and the downlink BWP identifier may be indicated by a BWP pair, where one BWP pair includes an uplink BWP identifier and a downlink BWP identifier. Furthermore, the BWP switching indication signaling may include uplink BWP identifiers and downlink BWP identifiers. Specifically, one of them may be designated as the uplink BWP identifier and downlink BWP identifier after switching, and the rest are candidate uplink BWP identifiers and downlink BWP identifiers after switching.

After receiving the BWP switching indication sent by the gateway station, the terminal needs to detect the Synchronization Signal Block (SSB) or common reference signal in the switched BWP to achieve the downlink frequency synchronization and beam capture, and performs the downlink synchronization with the switched downlink beam. After completing the downlink synchronization, the terminal performs the azimuth angle calibration and carrier frequency adjustment of the uplink beam, and sends a signal to the network on the switched uplink beam, specifically including: sends a PRACH signal to the gateway station on the time-frequency resources of the switched uplink beam indicated by the PRACH resource indication. The gateway station detects the PRACH signal of the terminal, where the PRACH signal can be used to notify the gateway station that the BWP switching of the terminal is completed and also used to maintain the uplink synchronization.

The so-called completion of the BWP switching here means that the terminal has completed the downlink synchronization in the new downlink BWP and also has completed the changes in the beam direction and the transmission carrier frequency of the uplink signal for the beam corresponding to the new uplink BWP, so that the terminal can receive downlink signals in the new BWP and can send signals in the new uplink BWP, but the network side still needs to perform the synchronization capture on the terminal's uplink. The final switching completion is confirmed on the network side.

Figure 2:
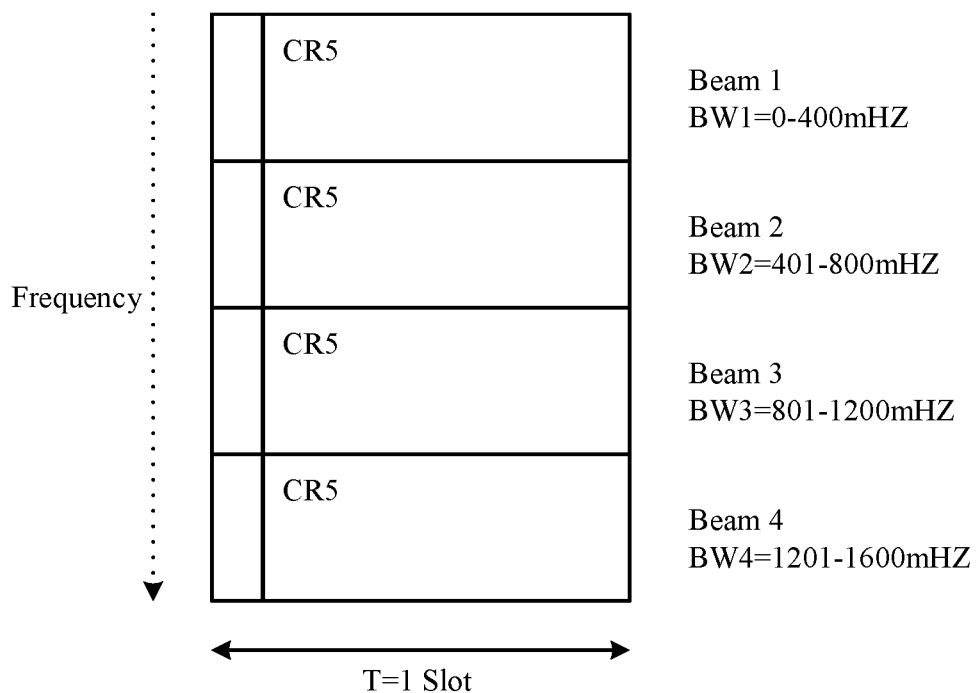
FIG. 2 is a schematic diagram of mapping between downlink beams and BWPs according to embodiments of the disclosure.
Figure 3:
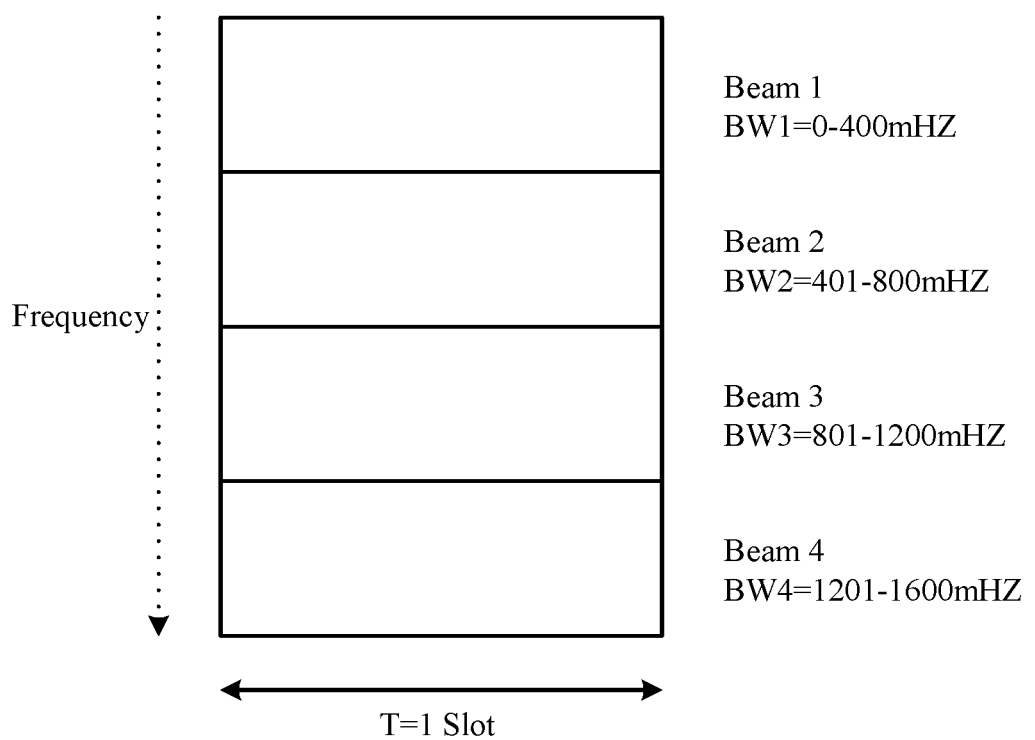
FIG. 3 is a schematic diagram of mapping between uplink beams and BWPs according to embodiments of the disclosure.

In an example, as shown in FIG. 2, four adjacent BWPs are used to correspond to four adjacent beams, and each BWP includes a bandwidth of 400 MHz and also includes one CRS (Cell specific RS) symbol, which is also called BRS (Beam specific RS). The CRS symbol is used for downlink synchronization and beam capture to help the terminal to establish the downlink time and frequency synchronization. The CRS is a BWP common reference signal. Similarly, as shown in FIG. 3, there are also four uplink BWPs, which are used to distinguish four adjacent beams.

During the BWP switching, the terminal assumes that adjacent BWPs are in the same cell and different beams are different only in frequency bands. When a beam moves to a critical point, the gateway station predicts that the terminal will belong to a new beam based on the measurement report of the terminal or based on the ephemeris information. At this time, the gateway station informs the terminal to perform the BWP switching. The configuration information of the four BWPs can be configured before switching. During the switching, assuming the Frequency Division Duplexing (FDD) mode is adopted, the BWP switching indication signaling needs to instruct the downlink BWP and the uplink BWP to switch at the same time. Therefore, the BWP switching indication signaling needs to include at least one or more of: uplink BWP ID, downlink BWP ID, and PRACH resource indication.

Here, the BWP ID can be indicated by a BWP pair, and one BWP pair includes an uplink BWP ID and a downlink BWP ID.

After receiving the BWP switching indication, the terminal needs to detect the SSB or common reference signal in the BWP included in the switching indication to achieve the downlink frequency synchronization and beam capture, and perform the downlink synchronization with the BWP included in the switching indication. Since adjacent satellite beams generally have a certain difference in azimuthal angle, and may pass through different Power Amplifiers (PAs) and radio frequency links, the terminal needs to adjust the antenna receiving angle and measure the downlink synchronization signal or common reference signal to complete the downlink frequency synchronization. If the adjacent beams have a difference in time delay, the time delay correction is also required.

After completing the downlink synchronization, the terminal sends a PRACH signal to the gateway station on the time-frequency resources indicated by the PRACH resource indication, and the gateway station detects the PRACH signal of the terminal, where the PRACH signal can notify the gateway station that the BWP switching of the terminal is completed.

It should be noted that the gateway station may also send a PRACH response message to the terminal according to the received PRACH signal, where the PRACH response message may include the Timing Advance (TA) and/or frequency offset information.

Figure 4:
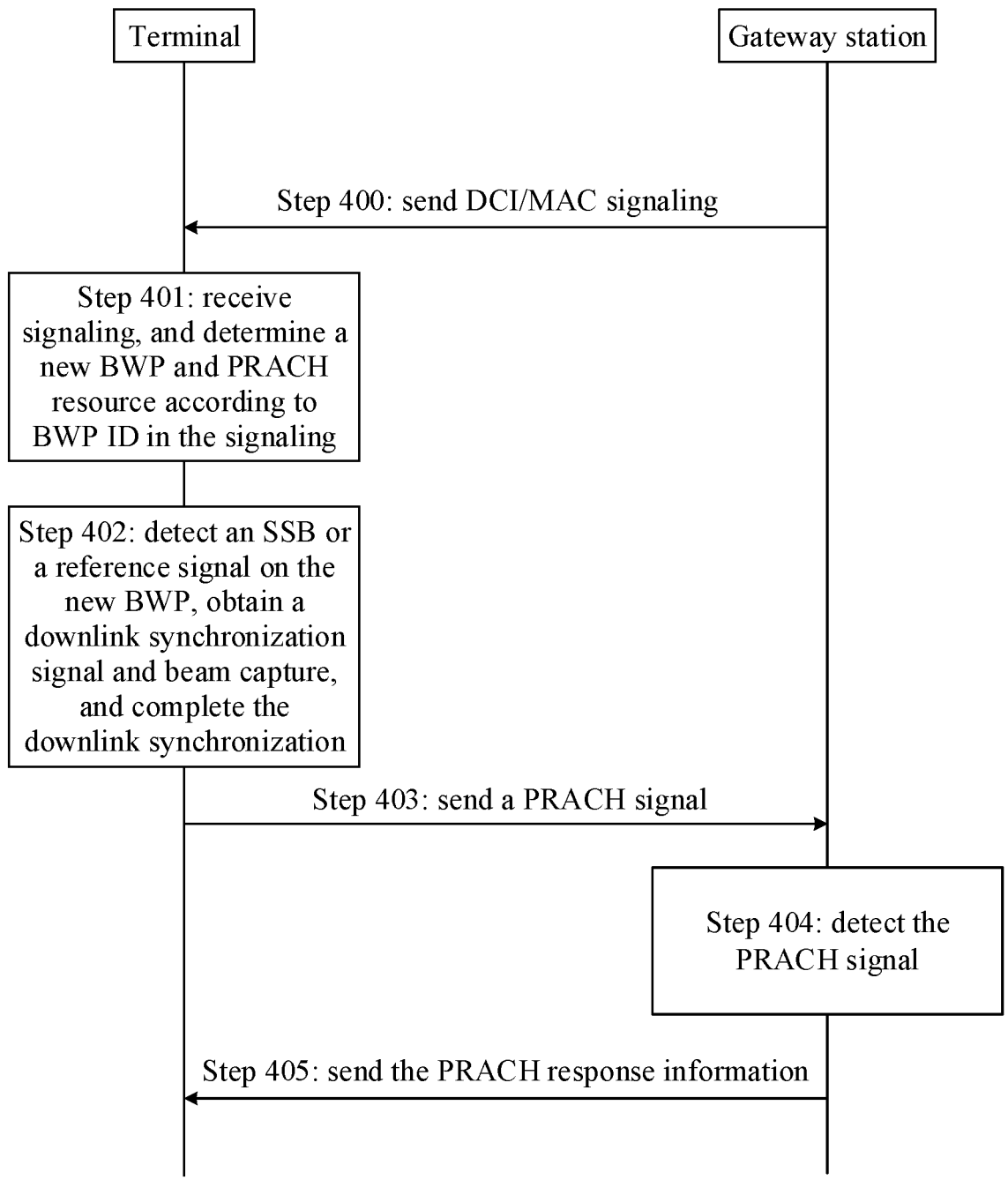
FIG. 4 is a schematic flowchart of a process of performing the beam switching by using a BWP switching command according to embodiments of the disclosure.

As shown in FIG. 4, the completion process of beam switching in the above example may include the following steps.

400: a gateway station sends the DCI signaling or MAC signaling to a terminal, wherein the DCI signaling or MAC signaling contains a BWP switching command, and the BWP switching command includes the uplink BWP ID, downlink BWP ID and PRACH resource indication.

401: the terminal receives the DCI signaling or MAC signaling sent by the gateway station, obtains the BWP switching command from the DCI signaling or MAC signaling, and obtains the uplink BWP ID, downlink BWP ID and PRACH resource indication included in the BWP switching command.

402: the terminal detects the SSB or common reference signal on the BWP included in the BWP switching command, obtains the downlink synchronization signal and beam capture, and performs the downlink synchronization with the BWP included in the BWP switching command.

403: the terminal sends a PRACH signal to the gateway station on the time-frequency resources indicated by the PRACH resource indication after completing the downlink synchronization with the BWP included in the BWP switching command.

404: the gateway station detects the PRACH signal sent by the terminal. If the signal is successfully detected, it can indicate that the terminal has completed the downlink beam switching and uplink beam calibration. At the same time, the frequency or timing information of the uplink signal may also be captured based on the detection of the PRACH signal to ensure the smooth communication of the uplink, and finally it is determined that the terminal completes the beam switching.

405: the gateway station sends the PRACH response information to the terminal, where the PRACH response information may include TA and/or frequency offset information.

Switching mechanism 2: a dynamic carrier switching command is used for beam switching.

Similar to the above switching mechanism 1, during the beam switching, if the adjacent beam is regarded as a new carrier, the adjacent beam is frequency division multiplexed, so the dynamic carrier switching command can be executed.

In the solution for beam switching using the dynamic carrier switching command provided in the embodiments of the disclosure, the configuration information of the new carrier can be configured before the switching, but the dynamic Carrier (CA) indication signaling needs to include at least one or more of: uplink CA identifier, downlink CA identifier, and PRACH resource indication.

Here, the dynamic carrier CA indication signaling may be completed by using DCI signaling or MAC signaling, and the CA identifiers are used to distinguish different CAs. In a specific implementation, the CA ID can be used.

It should be noted that the dynamic carrier CA indication signaling may include of uplink CA IDs and downlink CA IDs. Specifically, one of them may be designated as the uplink CA ID and downlink CA ID after switching, and the rest are candidate uplink CA identifiers and downlink CA identifiers after switching.

Switching mechanism 3: the beam recovery mechanism is used to complete the beam switching based on a beam measurement command sent by the gateway station.

Based on the beam maintenance mechanism of the NR, if the terminal finds that the quality of the monitored beam signal is poor in the designated beam measurement monitoring, the terminal can autonomously initiate the beam failure recovery operation, instruct the beam to switch to a new beam, and perform the data communication with the new beam, so the beam switching can be completed through the beam recovery mechanism. But, unlike the 5G NR, adjacent beams of the 5G NR are at the same frequency, while adjacent satellite beams are at different frequencies.

Specifically, the gateway station informs the terminal to monitor the reference signals of the serving beam of the current cell and the inter-frequency beam of the adjacent cell. When the Block Error Ratio (BLER) of the Physical Downlink Shared Channel (PDSCH) corresponding to the current serving beam is greater than a certain threshold, or the Reference Signal Receiving Power (RSRP) of the inter-frequency beam is higher than a certain threshold, or the RSRP of the inter-frequency beam is higher than the RSRP of the current serving beam, or the RSRP of the current serving beam is lower than a certain threshold, the terminal considers that the current serving beam fails to be connected. At this time, there is a need to restore the downlink beam and establish a connection with the new downlink beam. In the recovery process, the terminal also needs to notify the gateway station that the target beam can work normally, by using the PRACH signal on the time-frequency resources of the new uplink beam.

During the switching of satellite beams, the specific implementation steps of using the beam recovery mechanism for beam switching include: a gateway station configures reference signals of one or more candidate beams for a terminal to instruct the terminal to monitor the candidate beams; the gateway station configures the terminal with the dedicated PRACH resources for the terminal to send the indication information to the gateway station after the beam switching succeeds; the terminal determines that the current serving beam fails to be connected according to the beam monitoring result and detects a new candidate beam; the terminal establishes a connection with the new beam and send a PRACH signal to the gateway station on the new beam resource; and the gateway station confirms that the beam switching of the terminal is completed according to the PRACH signal sent by the terminal.

In an example, when the terminal is located at the beam boundary, the gateway station configures beam recovery signaling information for the terminal. The information includes: the PRACH resource indication, the configuration information of the reference signal of the serving beam including sequence and time-frequency position, and the frequency resources and the reference signal information of adjacent satellite beams.

Based on the beam maintenance mechanism, if the terminal finds that the quality of the monitored beam signal is poor in the designated beam measurement monitoring, the terminal can autonomously initiate the beam failure recovery operations, switch to a new beam, and perform the data communication with the new beam.

Since adjacent satellite beams are of different frequencies, the azimuth angles of different satellite beams are different. Therefore, the terminal needs to adjust the antenna receiving angle to obtain the downlink signals of the adjacent beams during the beam switching process.

In a specific implementation, in the beam measurement monitoring of the terminal, it is determined that the current serving beam fails to be connected when determining the reference signals of the serving beam of the current cell and the inter-frequency beams of the neighboring cells satisfy one or more of:

condition 1: the BLER of the PDSCH corresponding to the current serving beam is lower than a certain threshold;

condition 2: the RSRP of the current serving beam is lower than a certain threshold;

condition 3: the RSRP of the inter-frequency beam is higher than a certain threshold;

condition 4: the RSRP of the inter-frequency beam is higher than the RSRP of the current serving beam.

When one or more of the above conditions are met, the terminal considers that the current service beam fails to be connected, and establishes a connection with a new beam of the neighboring satellite. In the beam recovery process, the terminal needs to notify the gateway station that the new beam can work normally by using the PRACH signal.

Figure 5:
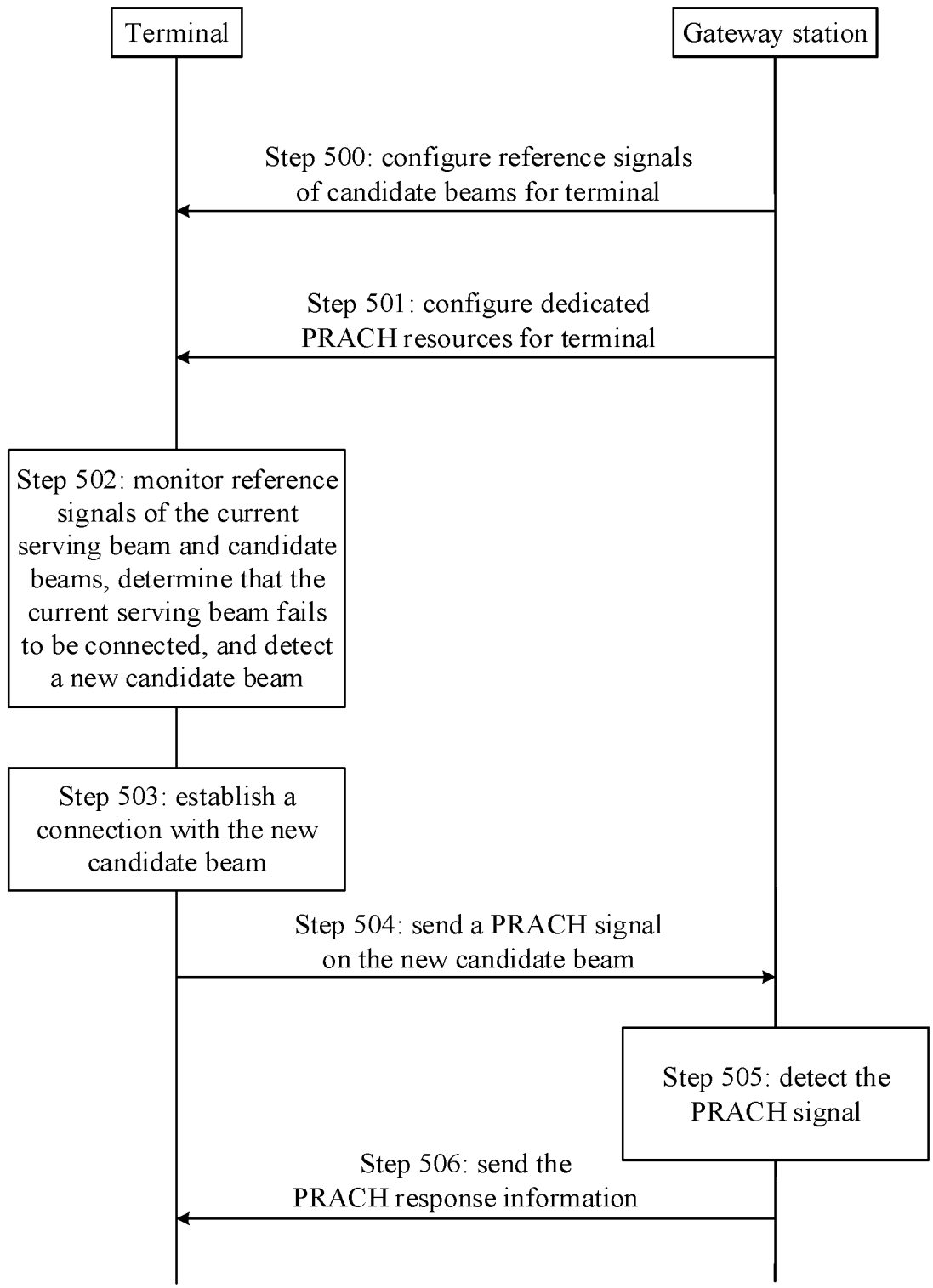
FIG. 5 is a schematic flowchart of a process of completing the beam switching by using a beam recovery mechanism according to embodiments of the disclosure.

As shown in FIG. 5, during the satellite beam switching, the specific implementation steps of using the beam recovery mechanism for beam switching include the following steps.

500: a gateway station configures reference signals of one or more candidate beams for a terminal to instruct the terminal to monitor the candidate beams.

501: the gateway station configures the terminal with the dedicated PRACH resources, to allow the terminal to send the indication information to the gateway station after the beam switching succeeds.

502: the terminal monitors the reference signal of the current serving beam and the reference signals of the candidate beams, determines that the current serving beam fails to be connected according to the beam monitoring result, and detects a new candidate beam.

503: the terminal establishes a connection with the new beam, including the switching of the downlink beam and the uplink beam, completes the synchronization of the new downlink beam, and adjusts the working carrier frequency and the beam azimuth angle of the terminal.

504-505: the terminal sends a PRACH signal to the gateway station on the new beam resource.

506: the gateway station sends the PRACH response information to the terminal, where the PRACH response information may include TA and/or frequency offset information.

Figure 6:
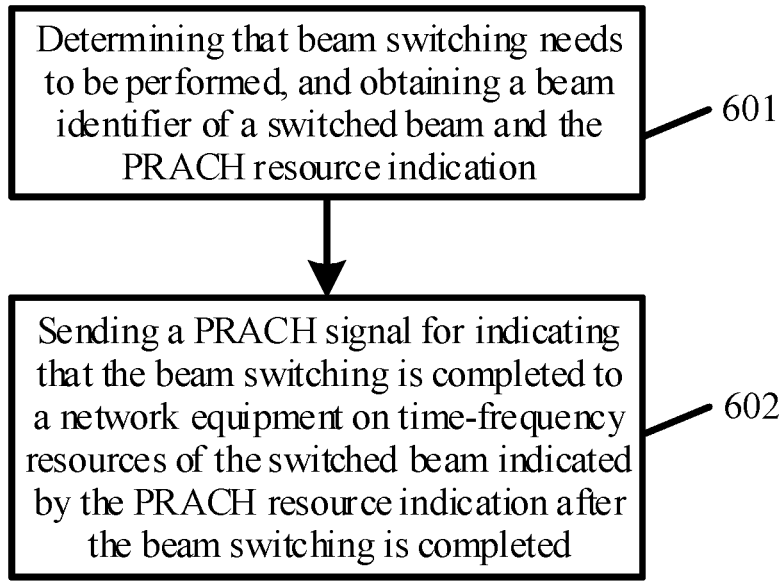
FIG. 6 is a schematic flowchart of a beam switching method at the terminal side according to embodiments of the disclosure.

As shown in FIG. 6, on the terminal side, embodiments of the disclosure provide a beam switching method, which specifically includes the following steps.

601: determining that beam switching needs to be performed, and obtaining a beam identifier of a target beam and the PRACH resource indication.

602: sending a PRACH signal for indicating that the beam switching is completed to a network equipment on time-frequency resources of the target beam indicated by the PRACH resource indication after the beam switching is completed.

In one embodiment, the step of determining that beam switching needs to be performed and obtaining a beam identifier of a target beam and PRACH resource indication includes: determining that beam switching needs to be performed upon receiving a beam switching command sent by the network equipment, and obtaining the beam identifier of the target beam and the PRACH resource indication from the beam switching command, wherein the beam switching command contains the target beam identifier and the PRACH resource indication.

In one embodiment, the beam switching command further includes candidate target beam identifiers.

In one embodiment, after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, the method further includes: detecting an SSB or a common reference signal of a beam identified by the beam identifier; and performing downlink synchronization with a downlink beam identified by the beam identifier based on the SSB or the common reference signal.

In one embodiment, after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, the method further includes: adjusting the carrier frequency and the transmission beam direction of the terminal to be aligned with the carrier frequency and the beam direction of an uplink beam identified by the beam identifier.

In one embodiment, the beam switching command includes a BWP switching command or a dynamic CA switching command;
when the beam switching command is a BWP switching command, the beam identifier includes: an uplink BWP identifier and a downlink BWP identifier;
when the beam switching command is a BWP switching command, the beam identifier includes: a BWP identifier pair including an uplink BWP identifier and a downlink BWP identifier;
when the beam switching command is a dynamic CA switching command, the beam identifier includes: an uplink carrier identifier and a downlink carrier identifier.

In one embodiment, the step of determining that beam switching needs to be performed and obtaining a beam identifier of a target beam and the PRACH resource indication includes: receiving configuration information sent by the network equipment for monitoring a reference signal of a candidate beam, wherein the configuration information includes reference signals of one or more candidate beams and PRACH resource indication; determining that a current serving beam fails to be connected according to the monitoring result of a reference signal of the current serving beam and the reference signals of the candidate beams, determining that beam switching needs to be performed, determining a beam identifier of a target beam from the candidate beams, and obtaining the PRACH resource indication from the configuration information.

In one embodiment, the step of determining that a current serving beam fails to be connected according to the monitoring result of a reference signal of the current serving beam and the reference signals of the candidate beams includes: determining that the current serving beam fails to be connected when determining, according to the monitoring result of the reference signal of the current serving beam and the reference signals of the candidate beams, that the reference signal of the current serving beam and the reference signals of the candidate beams satisfy one or more of:
condition 1: the BLER of a PDSCH corresponding to the current serving beam is greater than a first preset threshold;
condition 2: the RSRP of the current serving beam is less than a second preset threshold;
condition 3: the RSRP of at least one of the candidate beams is greater than a third preset threshold;
condition 4: the RSRP of at least one of the candidate beams is greater than the RSRP of the current serving beam.

In one embodiment, the step of determining a beam identifier of a target beam from the candidate beams includes: determining a beam identifier of a beam with RSRP greater than the RSRP of the current serving beam as the beam identifier of the target beam; or determining a beam identifier of a beam with RSRP greater than the third preset threshold as the beam identifier of the target beam.

In a specific implementation, if there are beams with RSRP greater than the RSRP of the current serving beam or there are beams with RSRP greater than the third preset threshold, then any one can be selected as the target beam when determining the target beam. Of course, the beam with the largest RSRP can be selected as the target beam, which is not limited in the embodiments of the disclosure.

In one embodiment, after determining the beam identifier of the target beam from the candidate beams and obtaining the PRACH resource indication from the configuration information, the method further includes: determining a switched uplink beam of a terminal based on the beam identifier of the target beam, and adjusting the carrier frequency and the transmission beam direction of the terminal to be aligned with the carrier frequency and the beam direction of the switched uplink beam.

In one embodiment, the PRACH response information sent by the network equipment is received, wherein the PRACH response information includes TA and/or frequency offset information.

Figure 7:
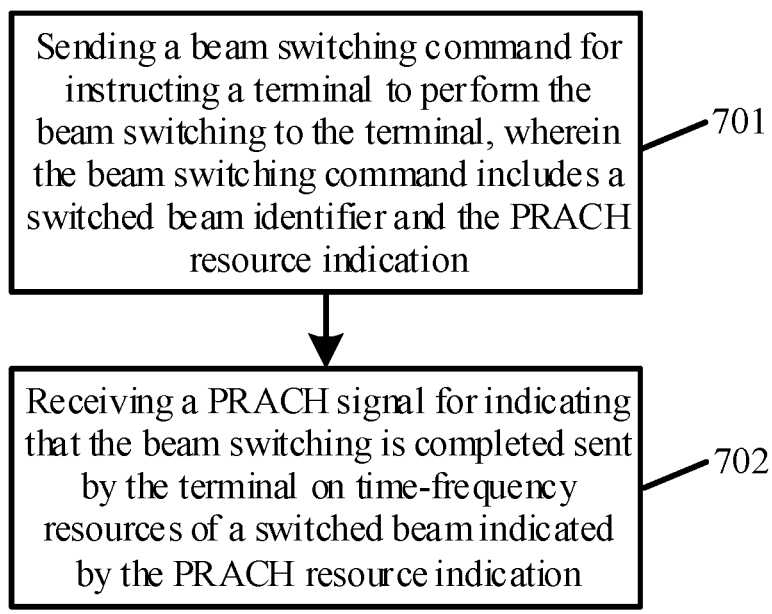
FIG. 7 is a schematic flowchart of a beam switching method at the network side according to embodiments of the disclosure.

As shown in FIG. 7, on the network side, a beam switching method provided by an embodiment of the disclosure includes the following.

701: sending a beam switching command for instructing a terminal to perform the beam switching to the terminal, wherein the beam switching command includes a target beam identifier and the PRACH resource indication.

702: receiving a PRACH signal for indicating that the beam switching is completed sent by the terminal on time-frequency resources of a target beam indicated by the PRACH resource indication.

In one embodiment, the beam switching command further includes candidate target beam identifiers.

In one embodiment, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In one embodiment, the step of sending a beam switching command for instructing a terminal to perform the beam switching to the terminal includes: sending a beam switching command for instructing a terminal to perform the beam switching to the terminal through DCI or MAC signaling.

In one embodiment, the configuration information for monitoring a reference signal of a candidate beam is sent to the terminal, wherein the configuration information includes reference signals of one or more candidate beams and the PRACH resource indication.

In one embodiment, the PRACH response information is sent to the terminal, wherein the PRACH response information includes TA and/or frequency offset information.

Based on the same inventive concept, embodiments of the disclosure further provide a beam switching apparatus. Since this apparatus is the apparatus in the method in the embodiments of the disclosure and the principle of this apparatus to solve the problem is similar to that of the method, the implementations of this apparatus can refer to the implementations of the method, and the repeated description thereof will be omitted here.

Figure 8:
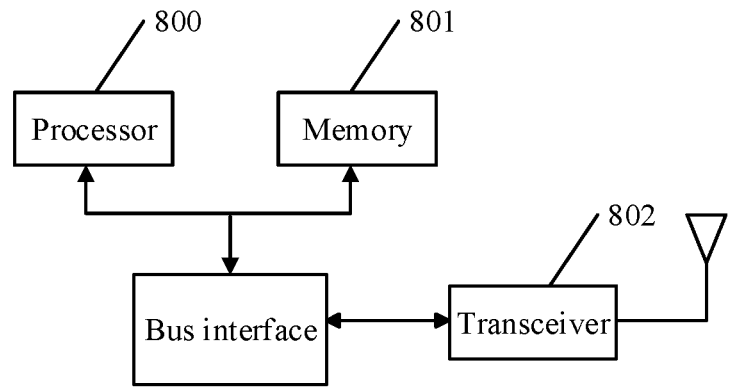
FIG. 8 is a structural schematic diagram of a beam switching apparatus at the terminal side according to embodiments of the disclosure.

As shown in FIG. 8, a beam switching apparatus provided by an embodiment of the disclosure includes: a processor 800, a memory 801, and a transceiver 802.

The processor 800 is responsible for managing the bus architecture and general processing, and the memory 801 may store the data used by the processor 800 when performing the operations. The transceiver 802 is configured to receive and send the data under the control of the processor 800.

The bus architecture may include any numbers of interconnected buses and bridges, and specifically link various circuits of one or more processors represented by the processor 800 and the memory represented by the memory 801. The bus architecture may further link various other circuits such as peripheral device, voltage regulator and power management circuit, which are all well known in the art and thus will not be further described again herein. The bus interface provides an interface. The processor 800 is responsible for managing the bus architecture and general processing, and the memory 801 may store the data used by the processor 800 when performing the operations.

The procedure disclosed by the embodiment of the disclosure may be applied in the processor 800 or implemented by the processor 800. In the implementation process, each step of the signal processing flow may be completed by the integrated logic circuit of hardware in the processor 800 or the instruction in the form of software. The processor 800 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 801, and the processor 800 reads the information in the memory 801 and completes the steps of the signal processing flow in combination with its hardware.

Here, the processor 800 is configured to read a program in the memory 801 and perform the process of: determining that beam switching needs to be performed, and obtaining a beam identifier of a target beam and PRACH resource indication; and sending a PRACH signal for indicating that beam switching is completed to a network equipment on time-frequency resources of the target beam indicated by the PRACH resource indication after the beam switching is completed.

In one embodiment, the processor 800 is specifically configured to: determine that beam switching needs to be performed upon receiving a beam switching command sent by the network equipment, and obtain the beam identifier of the target beam and the PRACH resource indication from the beam switching command, wherein the beam switching command contains the target beam identifier and the PRACH resource indication.

In one embodiment, the beam switching command further includes candidate target beam identifiers.

In one embodiment, the processor 800 is specifically configured to: after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, detect an SSB or a common reference signal of a beam identified by the beam identifier; and perform downlink synchronization with a downlink beam identified by the beam identifier based on the SSB or the common reference signal.

In one embodiment, after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, the carrier frequency and the transmission beam direction of the terminal are adjusted to be aligned with the carrier frequency and the beam direction of an uplink beam identified by the beam identifier.

In one embodiment, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In one embodiment, the processor 800 is specifically configured to:
receive the configuration information sent by the network equipment for monitoring a reference signal of a candidate beam, wherein the configuration information includes reference signals of one or more candidate beams and the PRACH resource indication;
determine that a current serving beam fails to be connected according to the monitoring result of a reference signal of the current serving beam and the reference signals of the candidate beams, determine that beam switching needs to be performed, determine the beam identifier of the target beam from the candidate beams, and obtain the PRACH resource indication from the configuration information.

In one embodiment, the processor 800 is specifically configured to: determine that the current serving beam fails to be connected when determining, according to the monitoring result of the reference signal of the current serving beam and the reference signals of the candidate beams, that the reference signal of the current serving beam and the reference signals of the candidate beams satisfy one or more of:
condition 1: the BLER of a PDSCH corresponding to the current serving beam is greater than a first preset threshold;
condition 2: the RSRP of the current serving beam is less than a second preset threshold;
condition 3: the RSRP of at least one of the candidate beams is greater than a third preset threshold;
condition 4: the RSRP of at least one of the candidate beams is greater than the RSRP of the current serving beam.

In one embodiment, the processor 800 is specifically configured to: determine a beam identifier of a beam with RSRP greater than the RSRP of the current serving beam as the beam identifier of the target beam; or determine a beam identifier of a beam with RSRP greater than the third preset threshold as the beam identifier of the target beam.

In one embodiment, the processor 800 is further configured to: after determining the beam identifier of the target beam from the candidate beams and obtaining the PRACH resource indication from the configuration information, determine a switched uplink beam of a terminal based on the beam identifier of the target beam, and adjust the carrier frequency and the transmission beam direction of the terminal to be aligned with the carrier frequency and the beam direction of the switched uplink beam.

In one embodiment, the processor 800 is further configured to: receive the PRACH response information sent by the network equipment, wherein the PRACH response information includes TA and/or frequency offset information.

Figure 9:
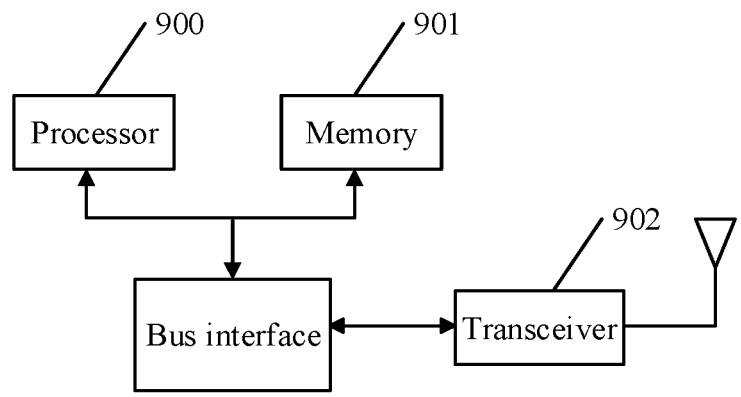
FIG. 9 is a structural schematic diagram of a beam switching apparatus at the network side according to embodiments of the disclosure.

As shown in FIG. 9, a beam switching apparatus provided by embodiments of the disclosure includes: a processor 900, a memory 901, and a transceiver 902.

The processor 900 is responsible for managing the bus architecture and general processing, and the memory 901 may store the data used by the processor 900 when performing the operations. The transceiver 902 is configured to receive and send the data under the control of the processor 900.

The bus architecture may include any numbers of interconnected buses and bridges, and specifically link various circuits of one or more processors represented by the processor 900 and the memory represented by the memory 901. The bus architecture may further link various other circuits such as peripheral device, voltage regulator and power management circuit, which are all well known in the art and thus will not be further described again herein. The bus interface provides an interface. The processor 900 is responsible for managing the bus architecture and general processing, and the memory 901 may store the data used by the processor 900 when performing the operations.

The procedure disclosed by the embodiment of the disclosure may be applied in the processor 900 or implemented by the processor 900. In the implementation process, each step of the signal processing flow may be completed by the integrated logic circuit of hardware in the processor 900 or the instruction in the form of software. The processor 900 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor may be a microprocessor or any conventional processor or the like. The steps of the method disclosed in combination with the embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 901, and the processor 900 reads the information in the memory 901 and completes the steps of the signal processing flow in combination with its hardware.

Here, the processor 900 is configured to read a program in the memory 901 and perform the process of: sending a beam switching command for instructing a terminal to perform the beam switching to the terminal, wherein the beam switching command includes a target beam identifier and the PRACH resource indication; and receiving a PRACH signal for indicating that the beam switching is completed sent by the terminal on time-frequency resources of a target beam indicated by the PRACH resource indication.

In one embodiment, the beam switching command further includes candidate target beam identifiers.

In one embodiment, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier;

when the beam switching command is a dynamic CA switching command, the beam identifier includes: an uplink carrier identifier and a downlink carrier identifier.

In one embodiment, the processor 900 is specifically configured to: send a beam switching command for instructing a terminal to perform the beam switching to the terminal through DCI or MAC signaling.

In one embodiment, the processor 900 is further configured to: send the configuration information for monitoring a reference signal of a candidate beam to the terminal, wherein the configuration information includes reference signals of one or more candidate beams and the PRACH resource indication.

In one embodiment, the processor 900 is further configured to: send the PRACH response information to the terminal, wherein the PRACH response information includes TA and/or frequency offset information.

Based on the same inventive concept, embodiments of the disclosure further provide a beam switching apparatus. Since this apparatus is the apparatus in the method in the embodiments of the disclosure and the principle of this apparatus to solve the problem is similar to that of the method, the implementations of this apparatus can refer to the implementations of the method, and the repeated description thereof will be omitted here.

Figure 10:
FIG. 10 is a structural schematic diagram of a beam switching apparatus at the terminal side according to embodiments of the disclosure.

As shown in FIG. 10, embodiments of the disclosure further provide a beam switching apparatus including a processing device 1001 and a sending device 1002, wherein the processing device 1001 is configured to determine that beam switching needs to be performed, and obtain a beam identifier of a target beam and the PRACH resource indication; the sending device 1002 is configured to send a PRACH signal for indicating that the beam switching is completed to a network equipment on time-frequency resources of the target beam indicated by the PRACH resource indication after the beam switching is completed.

In one embodiment, the processing device 1001 is specifically configured to: determine that beam switching needs to be performed upon receiving a beam switching command sent by the network equipment, and obtain the beam identifier of the target beam and the PRACH resource indication from the beam switching command, wherein the beam switching command contains the target beam identifier and the PRACH resource indication.

In one embodiment, the beam switching command further includes candidate target beam identifiers.

In one embodiment, the processing device 1001 is further configured to: after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, detect an SSB or a common reference signal of a beam identified by the beam identifier; and perform downlink synchronization with a downlink beam identified by the beam identifier based on the SSB or the common reference signal.

In one embodiment, the processing device 1001 is further configured to: after determining that beam switching needs to be performed and obtaining the beam identifier of the target beam and the PRACH resource indication, and before sending the PRACH signal for indicating that beam switching is completed to the network equipment on time-frequency resources of the target beam indicated by the PRACH resource indication, adjust the carrier frequency and the transmission beam direction of a terminal to be aligned with the carrier frequency and the beam direction of an uplink beam identified by the beam identifier.

In one embodiment, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In one embodiment, the processing device 1001 is specifically configured to: receive configuration information sent by the network equipment for monitoring a reference signal of a candidate beam, wherein the configuration information includes reference signals of one or more candidate beams and the PRACH resource indication; determine that a current serving beam fails to be connected according to the monitoring result of a reference signal of the current serving beam and the reference signals of the candidate beams, determine that beam switching needs to be performed, determine the beam identifier of the target beam from the candidate beams, and obtain the PRACH resource indication from the configuration information.

In one embodiment, the processing device 1001 is specifically configured to: determine that the current serving beam fails to be connected when determining, according to the monitoring result of the reference signal of the current serving beam and the reference signals of the candidate beams, that the reference signal of the current serving beam and the reference signals of the candidate beams satisfy one or more of:

condition 1: the BLER of a PDSCH corresponding to the current serving beam is greater than a first preset threshold;

condition 2: the RSRP of the current serving beam is less than a second preset threshold;

condition 3: the RSRP of at least one of the candidate beams is greater than a third preset threshold;

condition 4: the RSRP of at least one of the candidate beams is greater than the RSRP of the current serving beam.

In one embodiment, the processing device 1001 is specifically configured to: determine a beam identifier of a beam with RSRP greater than the RSRP of the current serving beam as the beam identifier of the target beam; or determine a beam identifier of a beam with RSRP greater than the third preset threshold as the beam identifier of the target beam.

In one embodiment, the processing device 1001 is further configured to: after determining the beam identifier of the target beam from the candidate beams and obtaining the PRACH resource indication from the configuration information, determine a switched uplink beam of a terminal based on the beam identifier of the target beam, and adjust the carrier frequency and the transmission beam direction of the terminal to be aligned with the carrier frequency and the beam direction of the switched uplink beam.

In one embodiment, the processing device 1001 is further configured to: receive the PRACH response information sent by the network equipment, wherein the PRACH response information includes TA and/or frequency offset information.

Figure 11:
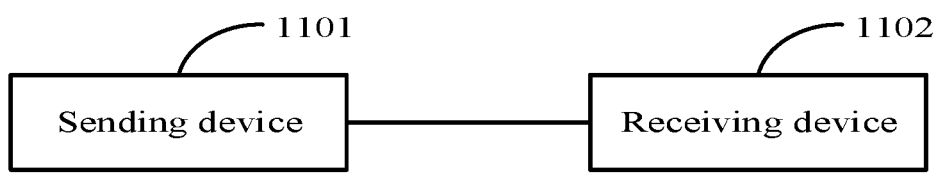
FIG. 11 is a structural schematic diagram of a beam switching apparatus at the network side according to embodiments of the disclosure.

As shown in FIG. 11, embodiments of the disclosure further provide a beam switching apparatus including a sending device 1101 and a receiving device 1102, wherein the sending device 1101 is configured to send a beam switching command for instructing a terminal to perform the beam switching to the terminal, wherein the beam switching command includes a target beam identifier and the PRACH resource indication; the receiving device 1102 is configured to receive a PRACH signal for indicating that the beam switching is completed sent by the terminal on time-frequency resources of a target beam indicated by the PRACH resource indication.

In one embodiment, the beam switching command further includes candidate target beam identifiers.

In one embodiment, the beam switching command includes a BWP switching command or a dynamic CA switching command; when the beam switching command is a BWP switching command, the beam identifier includes: an uplink BWP identifier and a downlink BWP identifier; or, when the beam switching command is a BWP switching command, the beam identifier includes: a BWP identifier pair including an uplink BWP identifier and a downlink BWP identifier; when the beam switching command is a dynamic CA switching command, the beam identifier includes: an uplink carrier identifier and a downlink carrier identifier.

In one embodiment, the sending device 1101 is specifically configured to: send a beam switching command for instructing a terminal to perform the beam switching to the terminal through DCI or MAC signaling.

In one embodiment, the sending device 1101 is further configured to: send the configuration information for monitoring a reference signal of a candidate beam to the terminal, wherein the configuration information includes reference signals of one or more candidate beams and the PRACH resource indication.

In one embodiment, the sending device 1101 is further configured to: send the PRACH response information to the terminal, wherein the PRACH response information includes TA and/or frequency offset information.

Embodiments of the disclosure further provide a computer-readable non-volatile storage medium including program codes. When the program codes run on a computing terminal, the program codes are configured to cause the computing terminal to perform the steps of the beam switching method of the embodiments of the disclosure described above.

The disclosure has been described above by reference to the block diagrams and/or flow charts showing the methods, devices (systems) and/or computer program products according to the embodiments of the disclosure. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Correspondingly, the disclosure can also be implemented by the hardware and/or software (including the firmware, resident software, microcode and the like). Further, the disclosure can adopt the form of computer program products on the computer usable or computer readable storage medium, which has the computer usable or computer readable program codes implemented in the medium, to be used by the instruction execution system or used in combination with the instruction execution system. In the context of the disclosure, the computer usable or computer readable storage medium can be any medium, which can contain, store, communicate with, transmit or transfer the programs, to be used by the instruction execution system, apparatus or device, or used in combination with the instruction execution system, apparatus or device.

The invention claimed is:

1. A beam switching method applied to a terminal side, comprising:
   determining that beam switching needs to be performed upon receiving a beam switching command sent by a network equipment, and obtaining a beam identifier of a target beam and a Physical Random Access Channel, PRACH, resource indication from the beam switching command;
   sending a PRACH signal for indicating that beam switching is completed to the network equipment on a time-frequency resource of the target beam indicated by a PRACH resource indication, after the beam switching is completed;
   wherein, the beam switching command is a Bandwidth Part, BWP, switching command, when downlink control information, DCI, signaling used for switching of adjacent BWPs comprises a resource indication for the terminal to perform beam indication in a switched BWP, different beams correspond to different BWPs in a one-to-one manner, and each BWP comprises one Beam specific Reference Signal, BRS, symbol for downlink synchronization and beam capture to help the terminal to establish the downlink time and frequency synchronization; wherein after obtaining the beam identifier of the switched beam and the PRACH resource indication, and before sending the PRACH signal for indicating that beam switching is completed to the network equipment on time-frequency resources of the switched beam indicated by the PRACH resource indication, the method further comprises: detecting a BRS on a BWP comprised in the BWP switching command, obtaining a downlink synchronization signal and beam capture, and performing the downlink synchronization with the BWP comprised in the BWP switching command;
   or
   the beam switching command is a dynamic carrier switching command, when an adjacent beam is regarded as a new carrier and the adjacent beam is frequency division multiplexed.

2. The method according to claim 1, wherein, the beam switching command further comprises a candidate target beam identifier.

3. The method according to claim 1, wherein, the determining that beam switching needs to be performed and obtaining a beam identifier of a target beam and a PRACH resource indication, comprises:
receiving configuration information sent by the network equipment for monitoring a reference signal of a candidate beam, wherein the configuration information comprises reference signals of one or more candidate beams and the PRACH resource indication;
determining that a current serving beam fails to be connected according to a monitoring result of a reference signal of the current serving beam and the reference signals of the candidate beams, determining that beam switching needs to be performed, determining a beam identifier of a target beam from the candidate beams, and obtaining the PRACH resource indication from the configuration information.

4. A beam switching method applied to a network side, comprising:
sending to a terminal a beam switching command for instructing a terminal to perform beam switching, wherein the beam switching command comprises a target beam identifier and a Physical Random Access Channel, PRACH, resource indication;
receiving a PRACH signal indicating that the beam switching is completed sent by the terminal on a time-frequency resource of a target beam indicated by a PRACH resource indication;
wherein the beam switching command is a BWP switching command, and different beams correspond to different BWPs in a one-to-one manner, when downlink control information, DCI, signaling used for switching of adjacent BWPs comprises a resource indication for the terminal to perform beam indication in a switched BWP, and each BWP comprises one Beam specific Reference Signal, BRS, symbol for downlink synchronization and beam capture to help the terminal to establish the downlink time and frequency synchronization;
or
the beam switching command is a dynamic carrier switching command, when an adjacent beam is regarded as a new carrier and the adjacent beam is frequency division multiplexed.

5. The method according to claim 4, wherein, the beam switching command comprises a candidate target beam identifier.

6. The method according to claim 4, wherein, the sending a beam switching command for instructing a terminal to perform beam switching to the terminal, comprises:
sending a beam switching command for instructing a terminal to perform beam switching to the terminal through a Downlink Control Information, DCI, signaling.

7. The method according to claim 4, wherein, the method comprises:
sending configuration information for monitoring a reference signals of a candidate beam to the terminal, wherein the configuration information comprises reference signals of one or more candidate beams and the PRACH resource indication.

8. The method according to claim 4, wherein, the method further comprises:
sending PRACH response information to the terminal, wherein the PRACH response information comprises Timing Advance, TA, and/or frequency offset information.

9. A beam switching apparatus, wherein, the apparatus comprises:
a processor, a memory and a transceiver;
the processor is configured to read computer instructions in the memory and perform following steps:
determining that beam switching needs to be performed upon receiving a beam switching command sent by a network equipment, and obtaining a beam identifier of a target beam and a Physical Random Access Channel, PRACH, resource indication from the beam switching command;
sending a PRACH signal for indicating that beam switching is completed to the network equipment on time-frequency resources of the target beam indicated by a PRACH resource indication after the beam switching is completed;
wherein, the beam switching command is a Bandwidth Part, BWP, switching command, when downlink control information, DCI, signaling used for switching of adjacent BWPs comprises a resource indication for the terminal to perform beam indication in a switched BWP, different beams correspond to different BWPs in a one-to-one manner, and each BWP comprises one Beam specific Reference Signal, BRS, symbol for downlink synchronization and beam capture to help the terminal to establish the downlink time and frequency synchronization; wherein after obtaining the beam identifier of the switched beam and the PRACH resource indication, and before sending the PRACH signal for indicating that beam switching is completed to the network equipment on time-frequency resources of the switched beam indicated by the PRACH resource indication, the processor is configured to perform:
detecting a BRS on a BWP comprised in the BWP switching command, obtaining a downlink synchronization signal and beam capture, and performing the downlink synchronization with the BWP comprised in the BWP switching command;
or
the beam switching command is a dynamic Carrier Aggregation, CA, switching command, when an adjacent beam is regarded as a new carrier and the adjacent beam is frequency division multiplexed.

10. The apparatus according to claim 9, wherein, the processor is specifically configured to:
receive configuration information sent by the network equipment for monitoring a reference signal of a candidate beam, wherein the configuration information comprises reference signals of one or more candidate beams and the PRACH resource indication;
determine that a current serving beam fails to be connected according to a monitoring result of a reference signal of the current serving beam and the reference signals of the candidate beams, determine that beam switching needs to be performed, determine a beam identifier of a target beam from the candidate beams, and obtain the PRACH resource indication from the configuration information.

11. A beam switching apparatus, wherein, the apparatus comprises:
a processor, a memory and a transceiver;
the processor is configured to read computer instructions in the memory and perform the process of:

sending a beam switching command for instructing a terminal to perform beam switching to the terminal, wherein the beam switching command comprises a target beam identifier and a Physical Random Access Channel, PRACH, resource indication;

receiving a PRACH signal for indicating that the beam switching is completed sent by the terminal on time-frequency resources of a target beam indicated by a PRACH resource indication;

wherein the beam switching command is a Bandwidth Part, BWP switching command, and different beams correspond to different BWPs in a one-to-one manner, when downlink control information, DCI, signaling used for switching of adjacent BWPs comprises a resource indication for the terminal to perform beam indication in a switched BWP, and each BWP comprises one Beam specific Reference Signal, BRS, symbol for downlink synchronization and beam capture to help the terminal to establish the downlink time and frequency synchronization; or the beam switching command is a dynamic carrier switching command, when an adjacent beam is regarded as a new carrier and the adjacent beam is frequency division multiplexed.

12. The apparatus according to claim 11, wherein, the beam switching command further comprises candidate target beam identifiers.

13. The apparatus according to claim 11, wherein, the processor is specifically configured to:

send a beam switching command for instructing a terminal to perform beam switching to the terminal through Downlink Control Information, DCI.

14. The apparatus according to claim 11, wherein, the processor is further configured to:

send configuration information for monitoring a reference signal of a candidate beam to the terminal, wherein the configuration information comprises reference signals of one or more candidate beams and the PRACH resource indication.

15. The method according to claim 1, wherein based on that the beam switching command is the BWP switching command, the beam identifier comprises: an uplink BWP identifier and a downlink BWP identifier; or, the beam identifier comprises: a BWP identifier pair comprising an uplink BWP identifier and a downlink BWP identifier;

based on that the beam switching command is the dynamic carrier switching command, the beam identifier comprises: an uplink carrier identifier and a downlink carrier identifier.

16. The method according to claim 4, wherein based on that the beam switching command is the BWP switching command, the beam identifier comprises: an uplink BWP identifier and a downlink BWP identifier; or, the beam identifier comprises: a BWP identifier pair comprising an uplink BWP identifier and a downlink BWP identifier;

based on that the beam switching command is the dynamic carrier switching command, the beam identifier comprises: an uplink carrier identifier and a downlink carrier identifier.

17. The apparatus according to claim 9, wherein based on that the beam switching command is the BWP switching command, the beam identifier comprises: an uplink BWP identifier and a downlink BWP identifier; or, the beam identifier comprises: a BWP identifier pair comprising an uplink BWP identifier and a downlink BWP identifier;

based on that the beam switching command is the dynamic carrier switching command, the beam identifier comprises: an uplink carrier identifier and a downlink carrier identifier.

18. The apparatus according to claim 11, wherein based on that the beam switching command is the BWP switching command, the beam identifier comprises: an uplink BWP identifier and a downlink BWP identifier; or, the beam identifier comprises: a BWP identifier pair comprising an uplink BWP identifier and a downlink BWP identifier;

based on that the beam switching command is the dynamic carrier switching command, the beam identifier comprises: an uplink carrier identifier and a downlink carrier identifier.

* * * * *